United States Patent [19]
Bostrom

[11] 3,731,085
[45] May 1, 1973

[54] CREDIT CARD OR THE LIKE

[75] Inventor: Sten-Lennart Bostrom, Hagersten, Sweden

[73] Assignee: Dasy Inter S.A., Geneva, Switzerland

[22] Filed: Nov. 5, 1970

[21] Appl. No.: 87,254

[30] Foreign Application Priority Data

Nov. 6, 1969   Switzerland.........................15203
Jan. 19, 1970   Switzerland............................577

[52] U.S. Cl..235/61.11 D, 235/61.12 M, 235/61.7 B
[51] Int. Cl............................G06k 7/08, G06k 19/08
[58] Field of Search................235/61.12 R, 61.12 M, 235/61.12 N, 61.11 D, 61.7 B; 340/149 A

[56] References Cited

UNITED STATES PATENTS

| | | | |
|---|---|---|---|
| 3,358,124 | 12/1967 | Smith et al......................235/61.11 D |
| 3,465,131 | 9/1969 | Ten Eyck.......................235/61.11 D |
| 3,279,826 | 10/1966 | Rudershausen..................235/61.7 B |
| 3,530,280 | 9/1970 | Goldman........................235/61.7 B |

*Primary Examiner*—Daryl W. Cook
*Attorney*—Hammond & Littell

[57] ABSTRACT

A system for checking cards serving as identification document and as proof of authorization, said system comprising; a card serving as identification document and as proof of authorization, comprising visual identification information carrying elements, and at least one recording medium carrying invisible information and comprising a thin sheet of non-magnetizable metal, being a magnetically shielding high-permeable alloy, containing as major components, iron and nickel in which sheet a number of areas having other magnetic properties than the remainder of the sheet are located to provide at least one unamendable authorization code pattern, and means for reading information contained in said cards, and means for checking the information read, and wherein said reading means comprises a slot for inserting said cards, at least one magnetic means located on one side of the inserted card, and magnetically operable means located on the opposite side of said card, the arrangement of at least said magnetically operable means corresponding to all possible code patterns on said sheet, and wherein a number of said magnetically operable means, upon the correct insertion of a card in said slot, are adapted to be magnetically influenced by said magnetic means, in correspondence to the code pattern of said inserted card, and to thereby control said checking means.

23 Claims, 15 Drawing Figures

Patented May 1, 1973  3,731,085

INVENTORS
STEN LENNART BOSTRÖM
JÖRGEN BROSOW

BY

ATTORNEYS

|   | 7 | 6 | 5 | 4 | 3 | 2 | 1 |
|---|---|---|---|---|---|---|---|
| 1 | X | 0 | X | 0 | X | 0 | X |
| 2 | X | X | 0 | 0 | X | X | 0 |
| 4 | X | X | X | X | 0 | 0 | 0 |
| 8 | 0 | 0 | 0 | 0 | 0 | 0 | 0 |

INVENTORS
STEN LENNART BOSTRÖM
JÖRGEN BROSOW

BY
*Hammond and Littell*
ATTORNEYS

Patented May 1, 1973

INVENTORS
STEN LENNART BOSTRÖM
JÖRGEN BROSOW

BY

ATTORNEYS

Patented May 1, 1973  3,731,085

INVENTORS
STEN LENNART BOSTRÖM
JÖRGEN BROSOW

BY
Hammond and Littell
ATTORNEYS

CREDIT CARD OR THE LIKE

Thus the present invention relates to a document having the double function of serving as evidence of identification and proof authorization and is more specifically directed to the construction of such documents in such manner as to make counterfeiting of the document impossible.

It is a principle object of the present invention to provide an improved form of a document being effectively counterfeitproof and giving the authorized owner the possibility of using the document to identify himself and to enable him to withdraw cash from automatic withdrawal devices or money slot machines or otherwise to use said document as a credit card.

For a better understanding of the invention and for a further description of its features and advantages, reference should be made to the following detailed description and to the accompanying drawings, in which.

Figure 1:
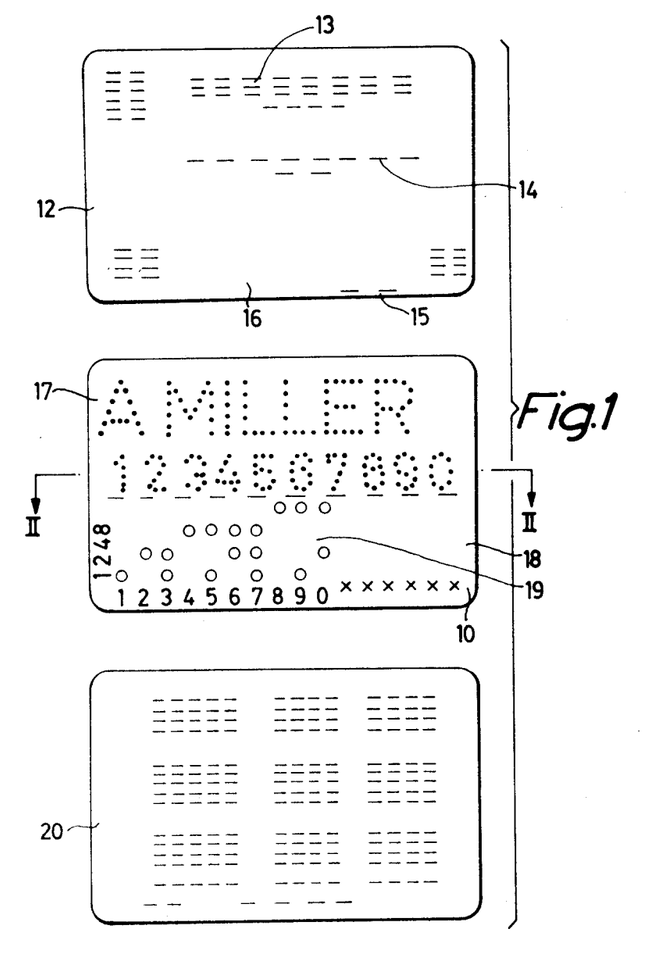
FIGS. 1 and 2 show the principal parts of the document.
Figure 2:
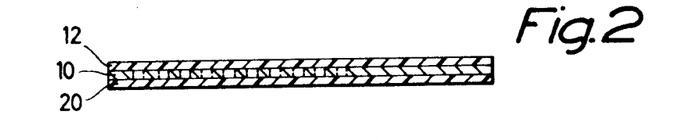

FIGS. 1 and 2 show a rigid or relatively rigid layer 10, made wholly or in part of magnetically shielding material, suitably a metal alloy such as mumetal. Layer 10 can be of virtually any shape, although the rectangular shape shown in FIGS. 1 and 2 seems to be preferable. Layer 10 is pierced with a number of holes that form a code that can be based on, for example, a coordinate system. The code punched out in the aforesaid FIG. comprises digits 1234567890. In addition to this code, the purpose and function of which will be described subsequently in more detail, other types of invisible code can be formulated in a similar manner for example the code indicated by x x x x x x in FIG. 1. In this manner, the layer is provided with a means of representing a part of a primary or unamendable information. The above-mentioned information is not intended for visual recognition, and therefore, layer 10 is encapsulated in an opaque coating of synthetic resin material or the like. This procedure can be accomplished by dipping or in some other suitable manner, the purpose of the procedure being to fill in entirely the code holes in the sheet. The document should — in order to impart both evidence of identification and proof of authorization to the document — also be provided with a photographic image of the holder and, if desirable, other personal data such as year, month and day of birth. This information can, for example, be applied by providing the document with a photographic emulsion intended to reproduce the image of the owner. The document is thereby provided with all of the requisite information which, in principle, because of the photographic image, gives visual information about the owner and, because of the aforesaid punched code, provides the document owner with authorization for different types of transactions such as opening a safe deposit box, removing money from automatic withdrawal devices etc. It is, of course, vital that documents used for the latter type of transaction cannot be used by anyone except the authorized owner of the document. In accordance with this invention it is therefore proposed that the document — in addition to the above mentioned unamendable information — be equipped with a means for recording and reading further amendable or secondary information, for example in the form of a magnetic strip 11 (FIG. 5) attached to one side of the document. The magnetic strip should be arranged so that special equipment can retrieve any desired type of information and present it in legible or coded form. Such secondary information can comprise a radioactive isotope coating as is known per se. When using, for example, only a beta isotope to obtain such secondary information the radiation is shielded by the magnetically shielding layer 10. A combination of beta and gamma isotope marking maybe used for providing an additional safety precaution.

At the top in FIG. 1 is shown the front layer 12 of the identification card provided with a text section 13 that contains, for example, the name of the issuing company. This latter information can also be embossed to advantage directly on layer 10 by means of an embossing procedure as is previously known. When the sheet is encapsulated in synthetic material the embossing will be visible. Beneath this section, there is a space at 14 for the user's signature. At 15 there is a space for the expiration date of the card, and at 16 there is a space for a photograph of the user. The magnetically shielding layer 10, covered by front layer 12, is provided with an upper section 17 where the user's name is punched into the layer, for example in a dotted pattern. The layer also has a lower section 18 where the card number is punched at 19 in the form of a code comprising holes arranged in four lines 1, 2, 4 and 8, and 10 columns 1,2,3,4,5,6,7,8,9 and 0. The punching at 17 can, for example, be used to advantage in X-ray photography for direct exposure on X-ray film. Thereby the lower section 18 should be shielded to prevent the exposure of code 19. In addition, the card carries a blind code (like a code having no significance) shown as X X X X X X and its corresponding holes (not shown). Alternatively, these holes could be interspersed with the holes having a real significance for the identification of the card number. The rear side 20 of the card is shown at the bottom of FIG. 1. It is preferably provided with printed instructions for the card owner.

FIG. 2 shows the complete card with layers 12, 10 and 20 assembled. The opaque layers 12 and 20 thus cover layer 10 that is pierced with holes. FIG. 2 is a section taken at arrows II — II in FIG. 1.

Figure 3:
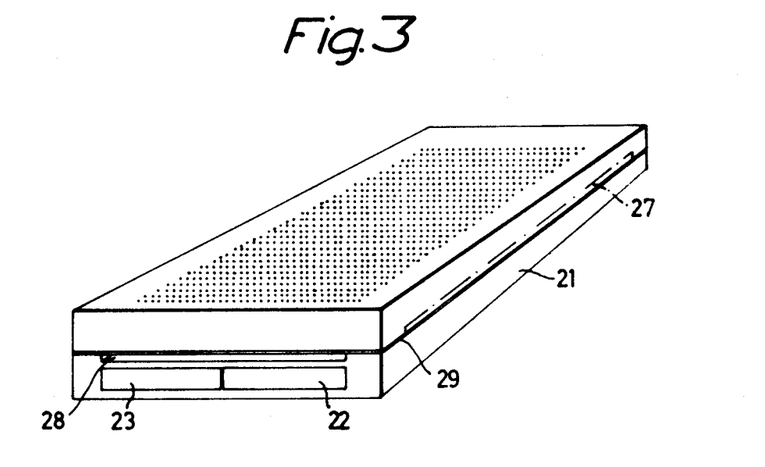
FIGS. 3 and 4 illustrate a mechanical reader intended for the document that serves as evidence of identification and proof of authorization.
Figure 4:
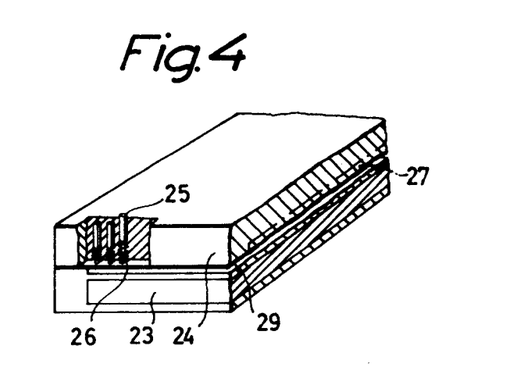

FIGS. 3 and 4 illustrate a reader for the card shown in FIGS. 1 and 2. This card is assumed to be a credit card intended for use in restaurants. The reader can be suitably located at the restaurant cashier's desk. It comprises a bottom part 21 provided with two magnets 22 and 23, preferably electromagnets, and a top part 24 provided with a large number of magnetically actuated pins or needles 25. When not actuated, each of these is pressed upward by its own spring 26. The impact action of the needles can be strengthened by electromagnetic solenoids. In this way a servo function is obtained thereby that the downward motions of the needles through holes actuate a microswitch which, in turn, operates the solenoid servo in order to reinforce the vertical motion of the needles. The reader has a side slot 27 where the restaurant bill can be inserted. FIG. 4 shows clearly that the bottom of slot 27 and the top of slot 28 are bounded by a shield 29 of non-magnetic material. A typewriter-type ribbon (not shown) is located beneath the aforesaid pins or needles 25. If the material from which the bill is made is self writing under pressure, no typewriter-type ribbon is needed, of course.

The reader operates as follows. A restaurant bill is first inserted in slot 27, whereupon the aforesaid typewriter-type ribbon lies against its top side. When the credit card is then inserted, an electric circuit to magnet 23 is simultaneously closed. Magnet 23 attracts needles 25, which are located above the holes that correspond to the credit card holder's name and account number within the upper section 17 of the card — and this information is printed as a result of the pressure exerted by these needles (against the typewriter-type ribbon) on the bill. Moreover, if so desired, the needles directly in front of code designation 19 can be attracted by closing a corresponding circuit for magnet 22. Code designation 19 is then printed on the bill. If magnets 22 and 23 are permanent magnets, they shall be inserted into the reader after the bill and card are in position in the reader. If, in this connection, it is not desirable that both legible information and coded information be printed on the bill, either magnet 22 or magnet 23 shall not be inserted into the bottom part 21. Magnets 22 and 23 are shaped so that they cannot be interchanged. After the bill and the credit card have been removed from the reader, the former can be used by the credit card issuer for manual processing or automatic data processing for the purpose of debiting the credit card owner.

Figure 5:
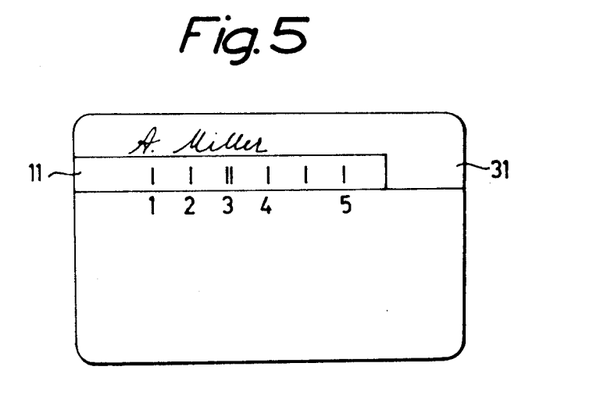
FIG. 5 shows a modified document in the form of an authorization card.

FIG. 5 shows a modified card, having a field for secondary information, part of which is in the form of a code 1, 2, 3, 4, 5 on magnetic strip 11, and part of this is in the form of the account holder's signature on a magnetic strip 31 and, possibly, a magnetic image of the account owner in the form of video information or a magnetic picture.

The aforesaid signature on magnetic tape 31 is written with a special magnetic pen when the owner signs the card, and it can be read only by a special opti-magnetic viewing device. If the card, for example, is a bank credit card, a bank clerk can use such a viewing device to look at the magnetic signature and check that it is the same as the visible signature of the account owner at position 14 (top in FIG. 1). The image information on the card can be viewed in the same way using a video viewing device or the aforesaid opti-magnetic viewing device.

The coded information on magnetic strip 11 can be recorded by the account owner himself on, for example, a bank credit card, using a special apparatus at the bank. This device is provided with an alphanumeric keyboard to which he has access when, for example, the card is delivered to him by a bank clerk. In this example, it has been assumed that the account owner depresses digits 1, 2, 3, 4 and 5 on the keyboard, whereby suitable codes for the complement numbers 9, 8, 7, 6 and 5 are recorded for purposes described below. This code is thus known only to the account owner himself, and it can be changed by him at any time after he has undergone the requisite identification and checks and been given access to the recording device at the bank office.

In summary, it can be said that a document that serves as evidence of identification and proof of authorization or as a credit card, in accordance with this invention can be provided with:

a. visual signature that can be checked with the unaided eye (at 14)
b. photograph (at 16)
c. built-in magnetic punched code (at 19). This code is, for example, an unamendable primary code based on a coordinate system with, possibly, a built-in blind code or protective code.
d. magnetic name and code designation (at 17).
e. invisible magnetic signature and image that can be checked with the aforesaid apparatus (at 31)
f. personal protective code (at 11)
g. in the event that the card is issued by a company, a government authority, a bank or the like, the issuer can provide the center layer with an embossed name, emblem or the like.

Figure 6:
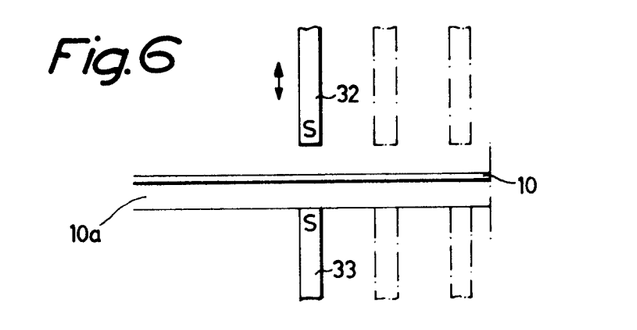
FIG. 6 shows a magnetic pin and needle device in a modified card reader.

The description of FIGS. 3 and 4 mentioned magnetizable or magnetically operable needles or pins 25 that were pressed upward by spring pressure and were pulled down by magnets 23 and 24 against the spring pressure through the holes in the magnetic shield layer 29. FIG. 6 shows an alternative version in which pins 32 are permanent magnets held down by gravity or by springs (not shown). In this version, the bottom part of the reader is provided with a number of permanent magnets 33, one for every possible hole position in shield layer 10. The pins 32 and magnets 33 are arranged so that like poles face each other (S in FIG. 6). At locations not corresponding to holes in shield layer 10, the pins will be at their lower position because, of the force of gravity; at locations where there are holes, the various magnets 33 will repel the corresponding pins 32 to an upper position. 10a designates the slot in which the card is inserted.

Figure 7:
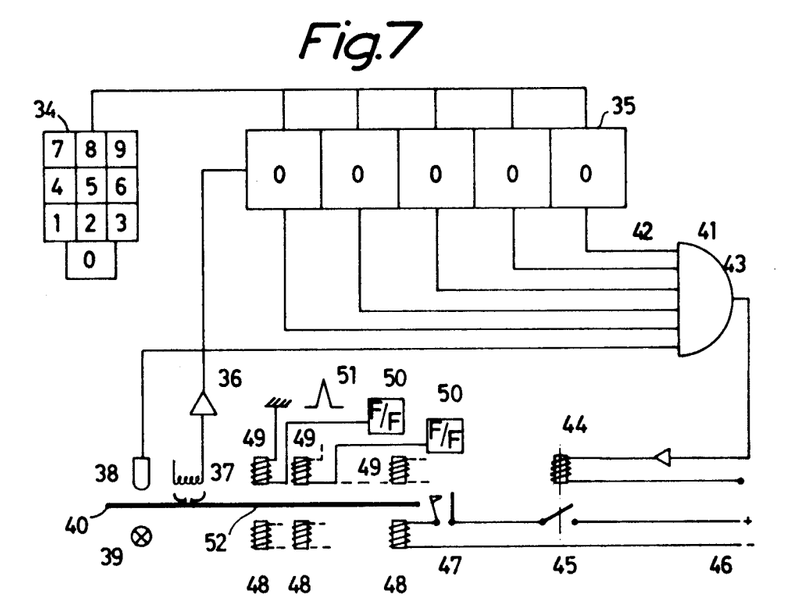
FIG. 7 shows an electric version of the reader.
Figure 8:
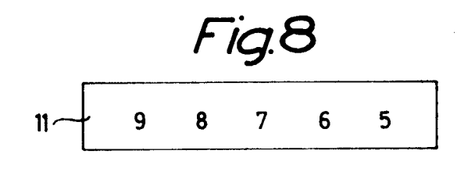
FIG. 8 shows a protective coding portion of the card.
Figure 9:
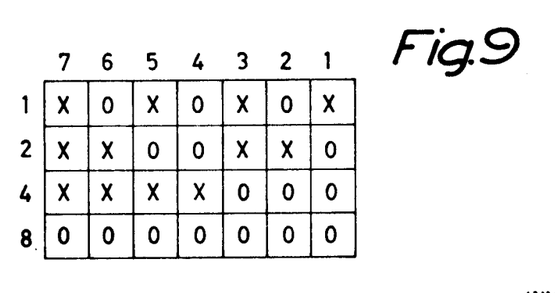
FIG. 9 shows schematically a read-in register for the device shown in FIG. 7.

FIG. 7 shows a verification system for a card in accordance with this invention, for example, a bank card for making withdrawal from an automatic withdrawal device. FIG. 8 shows the protective code on strip 11 in accordance with FIG. 5; in this code the complement of the digits keyed on the keyboard are recorded on the strip. FIG. 9 shows schematically a shift register included in a device like the one shown in FIG. 7. This shift register is shown in its final state for recording the bank card number that is assumed to be 1, 2, 3, 4, 5, 6, 7.

FIG. 7 shows a numerical keyboard 34 with number keys 0 through 9, on which the customer shall key his protective code (assumed to be 1, 2, 3, 4, 5) after he has inserted his card 40 into the card slot. This protective code actuates the five positions in register 35 so that the various digits are entered into these positions. When the card is correctly inserted, one of its ends actuates a normally open contact 47, at which time the other end of the card no longer prevents light from light source 39 from reaching photocell 38. The photocell is connected to an input 42 of an AND gate 41. A magnetic read head 37 receives successive pulses as the card is being inserted. These pulses correspond to the code on strip 11, and the digits recorded there namely 9, 8, 7, 6, 5 are entered via amplifier 36 into the corresponding positions in register 35. As a result, 0 will be obtained at all positions if the correct series of digits namely 1, 2, 3, 4, 5 were depressed on keyboard 34. All conditions at inputs 42 to the AND gate 41 are herewith fulfilled so that the output 43 of the gate actuates relay 44 which closes contact 45. Since contact 47 has already been closed by the card, a circuit is closed that runs from the power supply 46 to all of the electromagnetic coils 48 in the reader. As a result, all coils 49 that are positioned opposite to holes, 52 for example, emit a voltage pulse 51 which changes the state of an associated flip-flop 50 in a register like the one shown in FIG. 9. In this register, every flip-flop corresponds to a recording position. The register in FIG. 9 can be a shift register, and in such case only one coil 48 will be needed for every line 1, 2, 4, 8 in the card (see FIG. 1). In such case, contact 47 is not needed and as the card is inserted, the register is shifted step-by-step from column to column (1 − 7) as the card moves past the single coil 48 in each line until the final state, shown in FIG. 9, is reached. This means that the equivalent of the magnetic hole pattern of the card has been shifted into the register.

Figure 10:
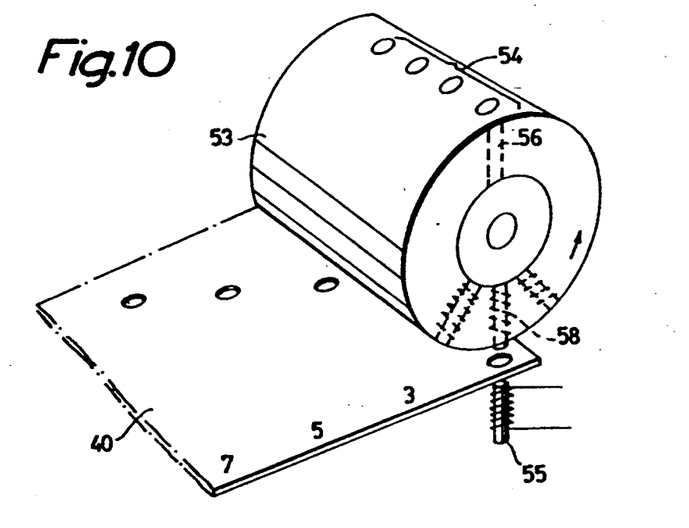
FIG. 10 shows a drum-type version of the reader.

FIG. 10 shows a reader in which a card supplies mechanical drive for tracked drum 53. The four tracks 54 on the drum correspond to lines 1, 2, 4 and 8. Each of the tracks has, for example, seven segments each corresponding to one of the seven positions in the register shown in FIG. 9. Card 40 is assumed, in one track, to have holes in positions 1, 2, 4 and 6 and no holes in positions 3, 5 and 7. A stationary electromagnet 55 interacts with card 40. Drum 53 is provided with electromagnets 58 that are spaced to correspond to the spacing of the hole positions on card 40. Alternatively, these magnets can be permanent magnets which, for example, are repelled by electromagnet 55 whenever a corresponding hole is encountered in card 40. These permanent magnets may penetrate drum 53 so that extensions on the permanent magnets form a pattern that corresponds to that of the actuated magnets, i.e. the code pattern on card 40. This pattern is formed on the drum-half opposite to that having the magnetic segments.

It is evident from the above that the drum can be used either to send the card code pattern to a matrix like the one shown in FIG. 9 of, by using the projecting magnet extensions in a pattern corresponding to the code pattern, can mechanically actuate a locking device. The reader will thereby be operable by cards having only one predetermined hole pattern.

Moreover, an arrangement can be made wherein magnets 58 are placed opposite not-holes in card 40, wherewith an incorrect card having a hole in one of these positions causes a magnet 58 to actuate a stop that prevents drum 53 from turning further, even though the card can be inserted all the way into the card slot. This will prevent the release of a lock operated by drum 53. This lock is described in greater detail below.

Figure 11:
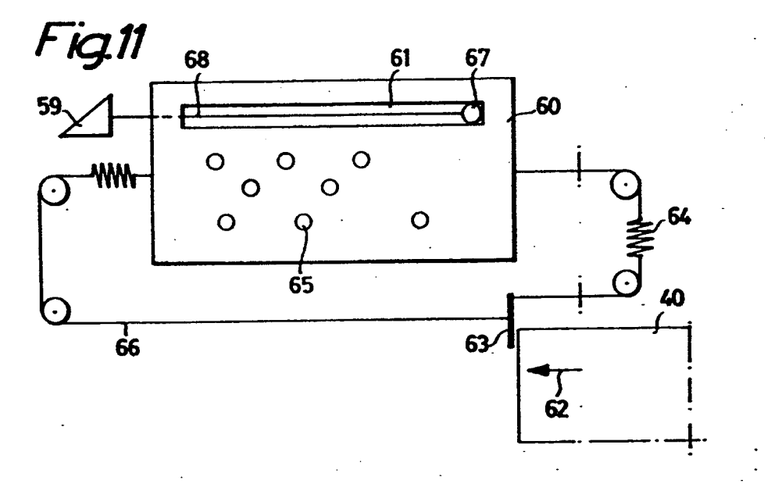
FIG. 11 shows a matrix plate and associated mechanical parts for a locking device operated by a card in accordance with this invention.

FIG. 11 shows a matrix plate 60 provided with a slot 61. A card used as proof of authorization 40 is inserted in the direction of arrow 62. As it is inserted it drives an actuator 63 which, in turn, actuates plate 60 via a draw cord provided with a spring 64 and attached to plate 60. Plate 60 is provided with holes 65 having a pattern that is inverse relative to the code pattern in card 40. As a result, if the correct card is inserted in the card slot, plate 60 can be moved forward until driver 67 reaches the edge 68 of slot 61 — and further motion of plate 60 will cause this edge to drive the driver to the right, therewith moving latch bolt 59 to the right so that the lock opens.

If another card 40 than that assigned to the lock is inserted into the card slot, sooner or later a pin 69 (FIG. 11a) will be pressed up into a hole 65 so that matrix plate 60 will be locked and cannot move any further in the direction of arrow 70. Thus the latch bolt 59 cannot be operated and the lock remains closed.

On the other hand, card 40 can be inserted all the way into the card slot because of the spring action provided by spring 64.

Figure 11A:
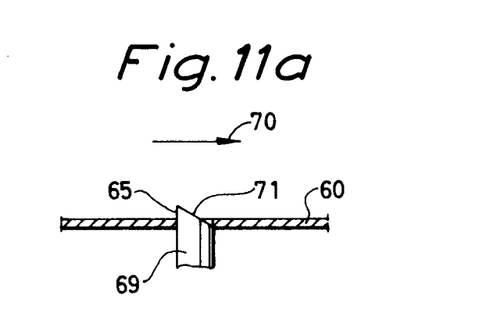
FIG. 11a shows one of the pins that interacts with the matrix plate.

Then when card 40 is removed from the card slot, spring 64 causes draw cord 66 to pull back plate 60, which cannot be locked against motion in the opposite direction to arrow 70 in FIG. 11a because pin 69 has a bevelled end 71.

Figure 12:
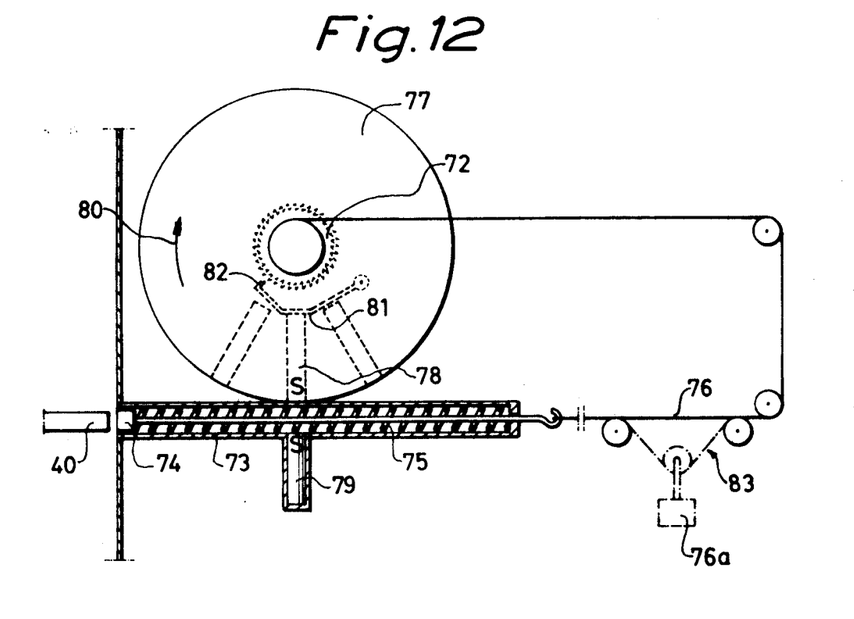
FIG. 12 shows another type of reader.

FIG. 12 shows another variant of a locking device in accordance with this invention. It is similar to that shown in FIG. 10. Card 40 is inserted in card slot 73 against a stop 74 which is pressed to the left by spring 75. Stop 74 is joined to a spring-loaded gear wheel 72 via a draw cord 75 which drives a drum 77. Drum 77, in the manner described previously, is provided with a number of tracks and positions having permanent magnets arranged in a pattern that is inverse relative to the code pattern on card 40. These permanent magnets have their south (S) poles facing the periphery of the drum. Beneath slot 73, at a suitable position, is a permanent magnet 79 with its south pole (S) facing the drum.

Briefly, this device operates as follows. As card 40 is inserted, the spring-loaded gear wheel 72 drives drum 77 in the direction shown by arrow 80. If card 40 is the correct card, this rotation proceeds during the entire card-insertion process and stops when the card is inserted all the way into slot 73, wherewith drum 77 carries out the desired function, releasing a lock for example. On the other hand, if card 40 is not the correct card, sooner or later magnet 79 will find itself directly opposite a magnet 78 and between them will be a hole in card 40, providing an opening in the magnetic shield. Magnet 78 will then be repelled upwards in FIG. 12 and will actuate a lever 81, which introduces catch 82 between two teeth on gear wheel 72. The wheel will thus be locked (as the latching device is magnetic and therefore self-holding). This will prevent further drum 77 rotation in the direction shown by arrow 80. And this will inhibit the aforesaid lock-releasing function. However, card 40 can be inserted to the bottom of slot 73 without having any further effect on gear wheel 72 and drum 77, whereupon draw cord 76, because of the action of weight 76a, assumes position 83.

When card 40 is then removed from slot 73, spring 75 presses stop 74 back to its end position to the left, thus releasing catch 81, 82 and spring action causes the gear wheel to drive drum 77 back to its initial position.

Figure 13:
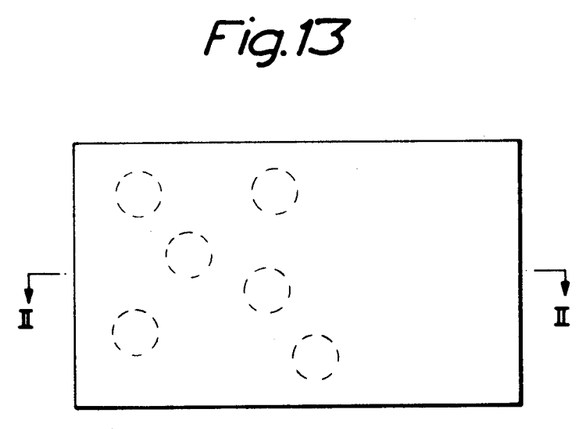
FIG. 13 and 14 show a second embodiment of the document.
Figure 14:
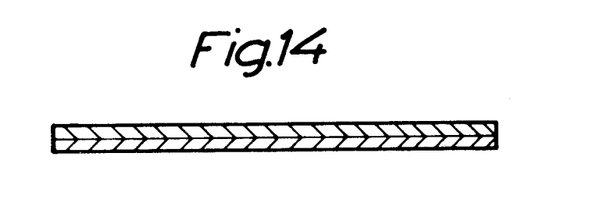

FIG. 13 is a front view of another embodiment of the core forming an essential part of the document according to the invention and FIG. 14 is a cross sectional view of the document according to FIG. 13.

Referring now to FIG. 13 and 14 and to the document shown therein, the core material consists of a metal alloy having magnetic shielding characteristics.

The magnetically-shielding material is a high-permeable alloy containing as major components, iron and nickel, such as Mumetal which is an iron-nickel alloy comprising 50 to 79 percent nickel.

This core material is subject to heating e.g. through laser beams. Such heating can be done spotwise on different places of the material in order to create an information. The magnetically shielding characteristics of the material are thereby reduced or eliminated and one obtains so called "magnetic holes". This means that magnetic flux more or less unimpededly can pass through these "holes" e.g. for checking said information in a reader of the kind described.

Through the heating, changes of tension in the material is caused and such changes of tension automatically causes changes of the characteristic of the material. Heating is only one melted to obtain such an effect.

To have the code marks of the kind described localized at certain, limited areas of the material, the whole core material is first refrigerated preferably to −40°C. It is thereafter heated on desired spots or areas of the material as described above.

Considering now the document as described in connection with FIG. 1 – 2 and FIG. 13 – 14 it is obvious, that the code mark information obtained by "mechanical" holes or "magnetic" holes gain the same purpose, while said "mechanical" holes and "magnetic" holes can be used in connection with the arrangement shown and described in connection with FIG. 3 – 12.

I claim:

1. A system for checking cards serving as identification document and as proof of authorization, said system comprising;
   1. a card serving as identification document and as proof of authorization, comprising
      a. visual identification information carrying elements, and
      b. at least one recording medium carrying invisible information and comprising
      c. a thin sheet of non-magnetizable metal, being a magnetically shielding high-permeable alloy, containing as major components, iron and nickel,
      d. in which sheet a number of areas having other magnetic properties than the remainder of the sheet are located to provide at least one unamendable authorization code pattern, and
   2. means for reading information contained in said cards, and
   3. means for checking the information read, and wherein said reading means comprises
      a. a slot for inserting said cards,
      b. at least one magnetic means located on one side of the inserted card, and magnetically operable means located on the opposite side of said card, the arrangement of at least said magnetically operable means corresponding to all possible code patterns on said sheet, and
      c. wherein a number of said magnetically operable means, upon the correct insertion of a card in said slot, are adapted to be magnetically influenced by said magnetic means, in correspondence to the code pattern of said inserted card, and to thereby control said checking means.

2. A system as claimed in claim 1, wherein said magnetically-shielding alloy is Mumetal.

3. A system as claimed in claim 1, wherein said sheet is sandwiched between two sheets of opaque plastic material, and wherein the areas providing said code pattern are physical holes in the sheet filled by said opaque material.

4. A system as claimed in claim 1, wherein said areas forming the code pattern are sheet areas from which the magnetic shielding characteristic has been eliminated.

5. A system as claimed in claim 1, wherein said areas forming the code pattern are sheet areas retaining the magnetic shielding characteristic of said alloy, whereas the remainder of the sheet consists of alloy areas from which the magnetic shielding characteristic has been eliminated.

6. A system as claimed in claim 1, wherein said other magnetic properties have been obtained by properly localized heat treatment of the sheet.

7. A system as claimed in claim 1, wherein a magnetic strip is provided for recording an amendable information recordable by the card owner only.

8. A system as claimed in claim 7, wherein said amendable information is the signature of the card owner.

9. A system as claimed in claim 1, wherein a field is provided for a magnetic picture of the card owner.

10. A system as claimed in claim 1, wherein said magnetic means consist of at least one permanent magnet having a surface area corresponding to the entire surface area occupied by said magnetically operable means.

11. A system as claimed in claim 1, wherein said magnetic means are permanent magnets the number of which corresponds to the total number of magnetically operable means.

12. A system as claimed in claim 1, wherein said magnetically operable means are movable pins arranged in the form of a matrix, and each provided with a respective spring keeping it in a resting position.

13. A system as claimed in claim 12, wherein a second slot is provided for insertion of a second card or the like said second card being arranged to receive and record information corresponding to at least part of the information on said first card inserted in said first mentioned slot.

14. A system as claimed in claim 13, wherein a protective plate is arranged for preventing said pins from touching said first mentioned card.

15. A system as claimed in claim 1, wherein a register is incorporated for recording a permanent code information on said card, said register having a number of storing positions.

16. A system as claimed in claim 15, wherein said register is a shift register with a number of position lines corresponding to information tracks of said card and a number of position columns corresponding to value columns of said card, said register being arranged to shift track information columnwise during the insertion of said card into said first mentioned slot.

17. A system as claimed in claim 15, wherein a register is incorporated for recording an amendable information on said card, said register having a number of storing positions.

18. A system as claimed in claim 17, wherein said register for amendable information, on zero-setting of all its positions, is arranged to open said permanent code register for reading said permanent code information of said card.

19. A system as claimed in claim 18, wherein an AND-gate having inputs from each position of said register for amendable information and an input from a photocell device indicating the complete insertion in said slot of said card and an output for current feeding to electro magnets, having coils arranged to control flip-flop circuits each representing a position in said permanent code register.

20. A system as claimed in claim 17, wherein a key board is arranged to be operated by the card owner with said amendable information which information is transferred to storing positions in said register, and a magnetic reader arranged as said card is inserted in the reading means — to read information recorded on said card, said last mentioned information being inverse to said amendable information, and to supply the inverse information to storing positions in said register for zero-setting said positions.

21. A system as claimed in claim 1, wherein said magnetic means consist of a number of magnets arranged on a rotating drum, and wherein said magnetically operable means are magnets on a cooperating drum, said magnets being arranged in a pattern corresponding to the area pattern of the card or in pattern inverse thereto, said drum being rotated by said card during the insertion thereof into said slot.

22. A system as claimed in claim 21, wherein said magnetically operable means have opposite elongations diametrically arranged on said drum and arranged to actuate a locking device.

23. A system as claimed in claim 1, wherein said magnetically operable means are arranged on a drum rotated by said card during the insertion thereof and wherein said magnetic means consist of a stationary magnet.

* * * * *

UNITED STATES PATENT OFFICE
CERTIFICATE OF CORRECTION

Patent No. 3,731,085　　　　　Dated May 1, 1973

Inventor(s) STEN-LENNART BOSTROM, ET. AL.

It is certified that error appears in the above-identified patent and that said Letters Patent are hereby corrected as shown below:

On the cover sheet [75], after "Sweden", insert -- ; Jorgen Brosow, Hof, Austria -- . On the cover sheet [30], "Switzerland", both occurrence, should read -- Sweden -- . Column 1, line 47, "virtually" should be cancelled.

Signed and sealed this 20th day of November 1973.

(SEAL)
Attest:

EDWARD M. FLETCHER, JR.　　　　RENE D. TEGTMEYER
Attesting Officer　　　　　　　　Acting Commissioner of Patents